United States Patent
Rider et al.

(10) Patent No.: US 9,133,008 B2
(45) Date of Patent: Sep. 15, 2015

(54) METHOD AND APPARATUS FOR BEVERAGE EXTRACTION WITH IMPROVED GAS CYLINDER ACCESS

(71) Applicant: Coravin, Inc., Burlington, MA (US)

(72) Inventors: Mike Rider, Lowell, MA (US); Otto Deruntz, Dunstable, MA (US); Lee Ka Wing, Yuen Long (HK)

(73) Assignee: Coravin, Inc., Burlington, MA (US)

( * ) Notice: Subject to any disclaimer, the term of this patent is extended or adjusted under 35 U.S.C. 154(b) by 0 days.

(21) Appl. No.: 14/299,387

(22) Filed: Jun. 9, 2014

(65) Prior Publication Data

US 2014/0367415 A1    Dec. 18, 2014

Related U.S. Application Data

(60) Provisional application No. 61/835,114, filed on Jun. 14, 2013.

(51) Int. Cl.
| | |
|---|---|
| *B67D 7/00* | (2010.01) |
| *B67D 1/08* | (2006.01) |
| *B67D 1/00* | (2006.01) |
| *F16K 17/06* | (2006.01) |

(Continued)

(52) U.S. Cl.
CPC ............ *B67D 1/0809* (2013.01); *B67D 1/0004* (2013.01); *B67D 1/0418* (2013.01); *B67D 1/0885* (2013.01); *F16K 17/0406* (2013.01); *F16K 17/065* (2013.01); *Y10T 137/7838* (2013.01); *Y10T 137/7922* (2013.01)

(58) Field of Classification Search
CPC ..... B65D 83/205; B65D 83/42; B67D 1/0809

USPC .................. 222/5, 80–83.5; 137/535, 512
See application file for complete search history.

(56) References Cited

U.S. PATENT DOCUMENTS

| | | | |
|---|---|---|---|
| 718,163 | A | 1/1903 | Sherrard |
| 1,509,916 | A | 9/1924 | Waite |
| 2,016,113 | A * | 10/1935 | Lambert et al. ............ 222/5 |

(Continued)

FOREIGN PATENT DOCUMENTS

| | | |
|---|---|---|
| FR | 2216514 A1 | 8/1974 |
| JP | 62136700 U  * | 8/1987 |

(Continued)

OTHER PUBLICATIONS

International Search Report and Written Opinion corresponding to PCT Application No. PCT/US2014/041465 dated Sep. 5, 2014.

(Continued)

*Primary Examiner* — Donnell Long
(74) *Attorney, Agent, or Firm* — Wolf, Greenfield & Sacks, P.C.

(57) ABSTRACT

Devices and methods for extracting a beverage from a container, such as a wine bottle. Beverage can be extracted from a container by inserting a needle through a container closure, such as a cork, delivering pressurized gas into the container via the needle, and dispensing beverage from the container via the needle. A pressure regulator may control a pressure of gas introduced into the container, and a lance used to pierce a pressurized gas cylinder may include a leading face arranged to reliably pierce a cylinder closure. The regulator may include valve features to reduce valve chatter or hammering and provide a more reliable pressure seal.

16 Claims, 13 Drawing Sheets

(51) Int. Cl.
   *F16K 17/04*   (2006.01)
   *B67D 1/04*   (2006.01)

(56) References Cited

U.S. PATENT DOCUMENTS

| | | | |
|---|---|---|---|
| 2,367,077 A | | 1/1945 | Ward |
| 2,496,258 A | | 2/1950 | Alexander |
| 2,585,253 A | * | 2/1952 | Kochner ........................ 222/5 |
| 2,613,849 A | * | 10/1952 | Ward .............................. 222/5 |
| 2,705,578 A | | 4/1955 | Burns |
| 3,191,533 A | | 6/1965 | Vandenberg |
| 3,200,094 A | | 8/1965 | Levinson et al. |
| 3,272,404 A | | 9/1966 | Graves et al. |
| 3,327,899 A | | 6/1967 | Reynolds et al. |
| 3,883,043 A | | 5/1975 | Lane |
| 3,976,221 A | | 8/1976 | Martin et al. |
| 4,011,971 A | | 3/1977 | Haydon |
| 4,143,678 A | | 3/1979 | Sugimura et al. |
| 4,473,174 A | | 9/1984 | Heuser |
| 4,475,576 A | | 10/1984 | Simon |
| 4,595,121 A | | 6/1986 | Schultz |
| 4,674,662 A | | 6/1987 | Bergstrom et al. |
| 4,691,482 A | | 9/1987 | Heinemann et al. |
| 4,694,850 A | | 9/1987 | Fumino |
| 4,706,847 A | | 11/1987 | Sankey et al. |
| 4,856,680 A | | 8/1989 | Sitton |
| 4,867,209 A | | 9/1989 | Santoiemmo |
| 4,932,561 A | | 6/1990 | Boxall |
| 4,976,894 A | | 12/1990 | Robinson |
| 4,982,879 A | | 1/1991 | Corrado et al. |
| 4,984,711 A | | 1/1991 | Ellis |
| 5,020,395 A | | 6/1991 | Mackey |
| 5,031,799 A | | 7/1991 | Owen |
| 5,139,179 A | | 8/1992 | Cecil |
| 5,163,909 A | | 11/1992 | Stewart |
| 5,180,081 A | | 1/1993 | McCann |
| 5,395,012 A | | 3/1995 | Grill et al. |
| 5,407,096 A | | 4/1995 | Smith |
| 5,413,230 A | | 5/1995 | Folter et al. |
| 5,413,247 A | | 5/1995 | Glasa |
| 5,590,696 A | | 1/1997 | Phillips et al. |
| 5,947,172 A | | 9/1999 | Glotin |
| 6,371,173 B1 | | 4/2002 | Liebmann, Jr. |
| 6,607,100 B2 | | 8/2003 | Phelps et al. |
| 6,789,698 B2 | | 9/2004 | Gloor et al. |
| 6,843,388 B1 | | 1/2005 | Hollars |
| 7,056,179 B2 | | 6/2006 | Courtney |
| 7,334,598 B1 | | 2/2008 | Hollars |
| 7,712,637 B2 | | 5/2010 | Lambrecht |
| 8,033,431 B2 | | 10/2011 | Sommerfield et al. |
| 8,225,959 B2 | | 7/2012 | Lambrecht |
| 2002/0084282 A1 | * | 7/2002 | Wu ................................... 222/5 |
| 2008/0000926 A1 | * | 1/2008 | Wang ............................... 222/5 |
| 2008/0245314 A1 | * | 10/2008 | Brodowski et al. ........... 119/651 |
| 2011/0016692 A1 | | 1/2011 | Hollars |
| 2011/0220106 A1 | | 9/2011 | Ganem et al. |
| 2014/0102560 A1 | | 4/2014 | Costle et al. |

FOREIGN PATENT DOCUMENTS

| | | |
|---|---|---|
| JP | S62136700 U | 8/1987 |
| WO | WO 0220713 A1 | 3/2002 |
| WO | WO 2011128620 A1 | 10/2011 |

OTHER PUBLICATIONS

Invitation to Pay Additional Fees in corresponding PCT Application No. PCT/US2014/041465 dated Aug. 29, 2014.

* cited by examiner

METHOD AND APPARATUS FOR BEVERAGE EXTRACTION WITH IMPROVED GAS CYLINDER ACCESS

CROSS REFERENCE TO RELATED APPLICATIONS

This application claims the benefit of U.S. patent application Ser. No. 61/835,114, filed Jun. 14, 2013, which is incorporated herein by reference in its entirety.

BACKGROUND OF INVENTION

This invention relates generally to accessing pressurized gas cylinders.

SUMMARY OF INVENTION

One or more embodiments in accordance with aspects of the invention allow a user to withdraw or otherwise extract a beverage, such as wine, from within a container that is sealed by a cork, plug, elastomeric septum or other closure without removing the closure. In some cases, removal of liquid from such a container may be performed one or more times, yet the closure may remain in place during and after each beverage extraction to maintain a seal for the container. Thus, the beverage may be dispensed from the bottle multiple times and stored for extended periods between each extraction with little or no effect on beverage quality. In some embodiments, little or no gas, such as air, which is reactive with the beverage may be introduced into the container either during or after extraction of beverage from within the container. Thus, in some embodiments, a user may withdraw wine from a wine bottle without removal of, or damage to, the cork, and without allowing air or other potentially damaging gasses or liquids entry into the bottle. However, not all embodiments require the ability to remove an extraction device from a cork or other closure such that the closure reseals the bottle.

Other aspects of the invention are described below and relate to methods and apparatus for piercing a gas cylinder, and regulating a pressure of gas provided from a gas cylinder.

For example, in one aspect of the invention, a piercing lance for piercing pressurized gas cylinders includes a body having a front piercing end, a rear end opposite the front piercing end, and a fluid passageway extending between the front piercing end and the rear end. The front piercing end may include a tapered portion having an opening at a distal end of the tapered portion and a longitudinal axis. The tapered portion may have a first surface partially defining the opening at the distal end that is arranged in a plane perpendicular to the longitudinal axis and a second surface partially defining the opening at the distal end that is arranged in a plane transverse and not perpendicular to the longitudinal axis. Such an arrangement in which the leading face of the piercing lance includes two surfaces at an angle to each other, e.g., of 20-35 degrees, may help in reliably piercing gas cylinders, including cylinders that have a metal closure. A first surface may cut an opening in the closure, while the second surface may aid in bending the cut portion of the closure away from the opening. As a result, the cut portion of the closure may remain attached to the cylinder and be prevented from covering the opening of the lance. In some embodiments, the second surface may be arranged in a plane that is at an angle of 55-70 degrees to the longitudinal axis. A line extending along an area where the first and second surfaces meet may pass through the opening, e.g., as a chord that may or may not pass through a center of the opening. The tapered portion may have an outer surface arranged at an angle of 10-30 degrees to the longitudinal axis, and may include a vent channel that extends from the first or second surface to a proximal end of the tapered portion. Such a vent channel may help vent a cartridge that is prematurely removed from the lance and/or help keep a cut portion of a cylinder closure attached to the cylinder. A gasket-contacting portion of the body may be located proximal of the tapered portion and be arranged to contact a gasket positioned between the lance and a gas cylinder and create a gas-tight seal between the gasket and the lance. In one embodiment, the gasket-contacting portion may include an annular surface arranged in a plane perpendicular to the longitudinal axis and/or a cylindrical surface that extends around the longitudinal axis. The rear end of the body may include a gasket arranged to form a seal with a bore in which the rear end of the body is positioned, e.g., a bore of a pressure regulator that receives the lance.

In another aspect of the invention, a fluid pressure regulator includes a first stage valve arranged to open and close a fluid flow path to control flow of fluid through the valve. The first stage valve may include a first valve body defining a valve chamber having an outlet opening and an inlet opening, a first valve gasket arranged in the valve chamber at the outlet opening, a first valve ball movable in the valve chamber to contact the first valve gasket and close the outlet opening, and a gasket retainer in the valve chamber and stationary relative to the first valve body arranged to hold the first valve gasket at the outlet opening. A first stage piston may be arranged for movement to move the first valve ball relative to the outlet opening and thereby open and close the first stage valve, and a regulator body may define a piston chamber in which the first stage piston is movable and may house the valve chamber. In one embodiment, the gasket retainer may include a cylindrical shell portion and an inwardly extending flange at a gasket end of the retainer arranged to contact the first valve gasket. The flange may have an annular shape and taper inwardly from the cylindrical shell portion. The first valve gasket may be arranged to deform with contact with the first valve ball, and the gasket retainer may be arranged in the valve chamber to restrict movement of the gasket due to deformation of the gasket. For example, the gasket retainer may be arranged to restrict movement of the gasket so that the gasket prevents contact of the first valve ball with the first valve body near the outlet opening. This arrangement may help prevent contact of a metal valve ball with a metal valve body, thereby reducing wear.

In one embodiment, the valve piston includes a depressor to contact and move the valve ball to open/close the valve, and the depressor may have a rigid, convex contact surface arranged to contact the first valve ball. This arrangement may help prevent the valve ball from following a same track during opening and closing movement, thus more evenly wearing the valve ball, gasket and/or depressor and/or allowing the valve to open and close to regulate pressure with reduced chattering or hammering of the valve ball.

In another aspect of the invention, a fluid pressure regulator includes a first stage valve arranged to open and close a fluid flow path to control flow of fluid through the valve. The first stage valve may include a first valve body defining a valve chamber having an outlet opening and an inlet opening, a first valve gasket arranged in the valve chamber at the outlet opening, and a first valve ball movable in the valve chamber to contact the first valve gasket and close the outlet opening. A first stage piston may be arranged for movement to move the first valve ball relative to the outlet opening and thereby open and close the first stage valve. A molded plastic regulator body may define a piston chamber in which the first stage piston is movable and house the valve chamber, and the first valve body may be a metal component positioned in a cavity of the molded plastic regulator body. For example, the valve body may include a metal cylinder that is co-molded with the regulator body. This arrangement may allow the regulator to suitably withstand relatively high pressures, e.g., 1000, 2000, 3000 psi or more, while employing a plastic regulator body. That is, only that portion of the regulator that is exposed to high pressure, e.g., the valve chamber, need be made of metal or other suitable material to withstand the high pressure while other portions of the regulator are made to withstand lower pressures, e.g., 30-100 psi.

Various exemplary embodiments of the device are further depicted and described below.

BRIEF DESCRIPTION OF THE DRAWINGS

Aspects of the invention are described with reference to various embodiments, and to the figures, which include.

DETAILED DESCRIPTION

Figure 1:
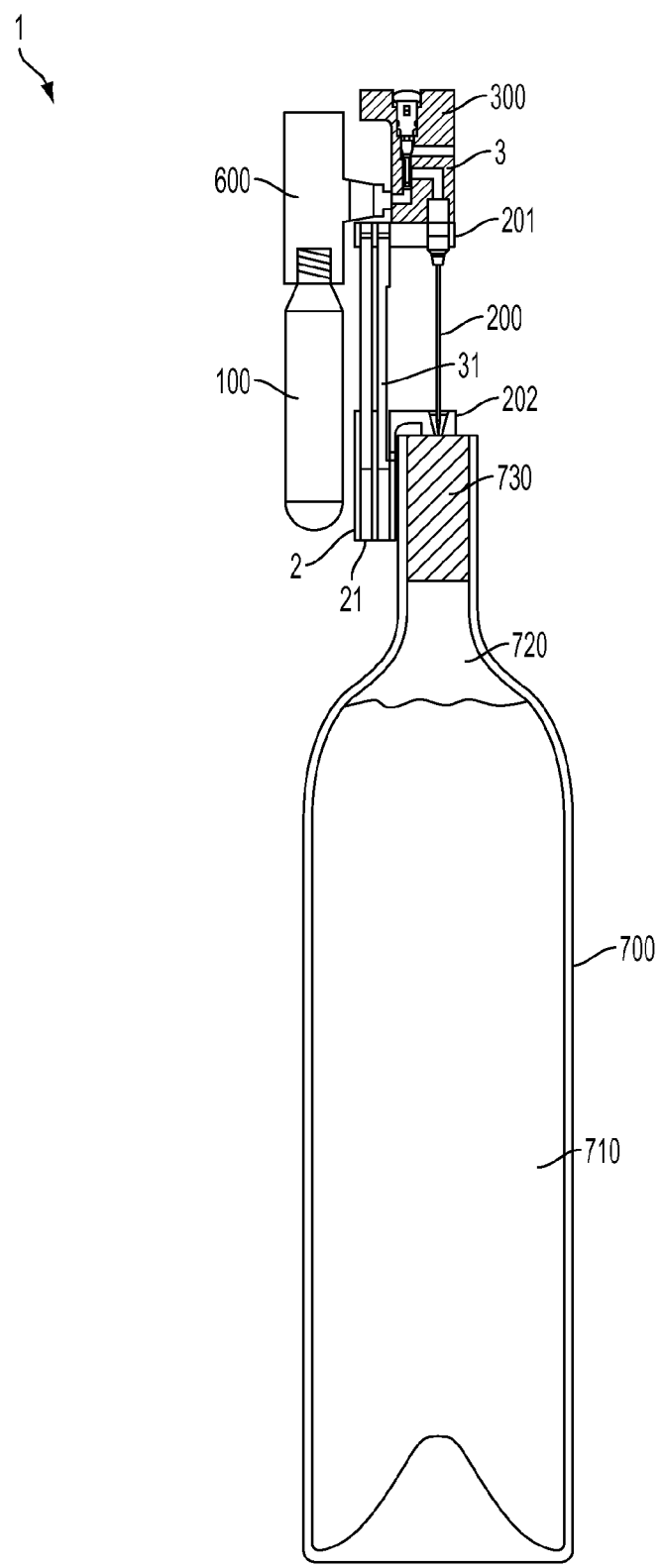
FIG. 1 shows a sectional side view of a beverage extraction device in preparation for introducing a needle through a closure of a beverage container.

Aspects of the invention are described below with reference to illustrative embodiments, but it should be understood that aspects of the invention are not to be construed narrowly in view of the specific embodiments described. Thus, aspects of the invention are not limited to the embodiments described herein. It should also be understood that various aspects of the invention may be used alone and/or in any suitable combination with each other, and thus various embodiments should not be interpreted as requiring any particular combination or combinations of features. Instead, one or more features of the embodiments described may be combined with any other suitable features of other embodiments.

FIGS. 1-4 show schematic views of one embodiment of a beverage extraction device 1 that may incorporate one or more aspects of the invention. This illustrative system 1 includes a body 3 with an attached pressurized source of gas 100 (such as a compressed gas cylinder) that provides gas under pressure (e.g., 2600 psi or less as dispensed from the cylinder) to a regulator 600. In this arrangement, the cylinder 100 is secured to the body 3 and regulator 600 by a threaded connection, although other configurations are possible, such as those described below and/or in U.S. Pat. No. 4,867,209; U.S. Pat. No. 5,020,395; and U.S. Pat. No. 5,163,909 which are hereby incorporated by reference with respect to their teachings regarding mechanisms for engaging a gas cylinder with a cylinder receiver. The regulator 600 is shown schematically and without detail in FIGS. 1-4, but specific embodiments are described below and/or could include any of a variety of commercially available or other single or multi-stage pressure regulators capable of regulating gas pressures to a pre-set or variable outlet pressure. The main function of the regulator 600 is to provide gas at a pressure and flow rate suitable for delivery to the container 700 (such as a wine bottle), e.g., so that a pressure established inside the container 700 does not exceed a desired level, such as a level that ensures the closure 730 will not be expelled.

In this embodiment, the body 3 also includes a valve 300 operable to control the flow of gas from the regulator 600. The valve 300 may be a 3-way toggle valve that includes a single operation button and functions to selectively introduce pressurized gas into the container 700 and extract beverage 710 (such as wine) from the container 700 via a needle 200. Details regarding the operation of such a valve 300 are provided in U.S. Pat. No. 8,225,959, which is incorporated by reference in its entirety. However, other valve arrangements for controlling pressurized gas and beverage flow are possible, including those described below and which incorporate aspects of the invention.

To introduce gas into the container 700 and extract beverage, a needle 200 attached to the body 3 is inserted through a cork or other closure 730 that seals an opening of the container 700. This illustrative system 1 uses a pencil-tip non-coring needle 200 with a needle opening 220 along a sidewall of the needle near the needle tip. While the needle 200 may be inserted into the cork or other closure 730 in different ways, in this embodiment, the system 1 includes a base 2 with a pair of channels 21 that receive and guide movement of respective rails 31 of the body 3. Thus, movement of the body 3 and attached needle 200 relative to the container closure 730 may be guided by the base 2, e.g., the body 3 may slide relative to the base 2 to move the needle 200 into/out of the closure 730. In addition, movement of the needle 200 may be guided by a needle guide 202 that is attached to the base 2 and positioned over the closure 730. Other arrangements for guiding movement of the body 3 relative to the base 2 are possible, such as providing one or more rails on the base 2 which engage with a channel or other receiver of the body 3, providing an elongated slot, channel or groove on the body or base which engages with a corresponding feature (e.g., a tab) on the other of the body or base and allows for sliding movement, a linkage that connects the body and base together and allows for movement of the body to insert the needle into the closure, and others. In yet other embodiments, the body 3 need not be movable relative to the base 2, but may be fixed to each other. In this case, needle insertion may be performed by moving the body and base together relative to the container.

In some embodiments, the base 2 may be fixed or otherwise held in place relative to the container 700, e.g., by a clamp, sleeve, strap or other device that engages with the container 700. Clamp arrangements may be used to temporarily or releasably secure the device 1 to a wine bottle neck or other container 700. By restraining movement of the base 2 relative to the container 700, such an arrangement may help guide motion of a needle 200 relative to the container 700 when penetrating a closure 730, or when being withdrawn from the closure 730. Alternately, the container 700 may be manipulated by grasping and manipulating the device 1 since the clamp engaging the device 1 to the container 700 may securely hold the device 1 and container 700 together.

Figure 2:
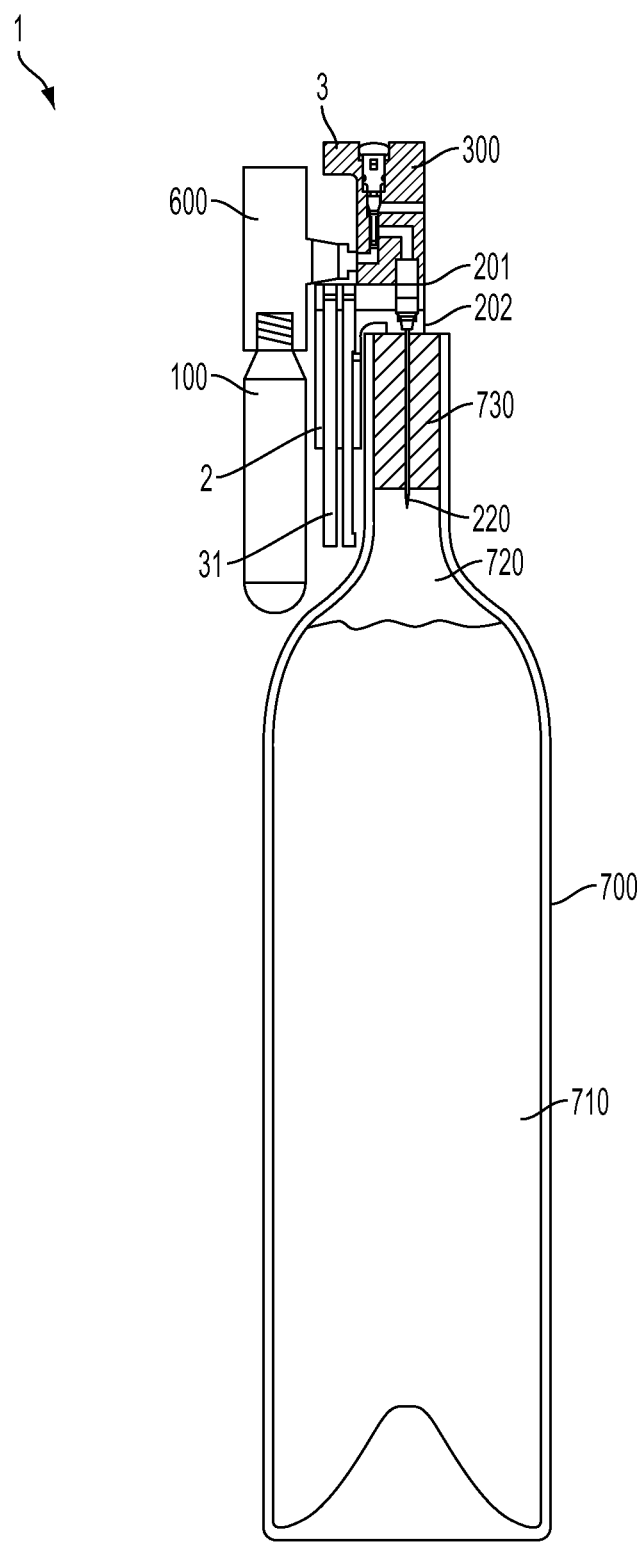
FIG. 2 shows the FIG. 1 embodiment with the needle passed through the closure.
Figure 3:
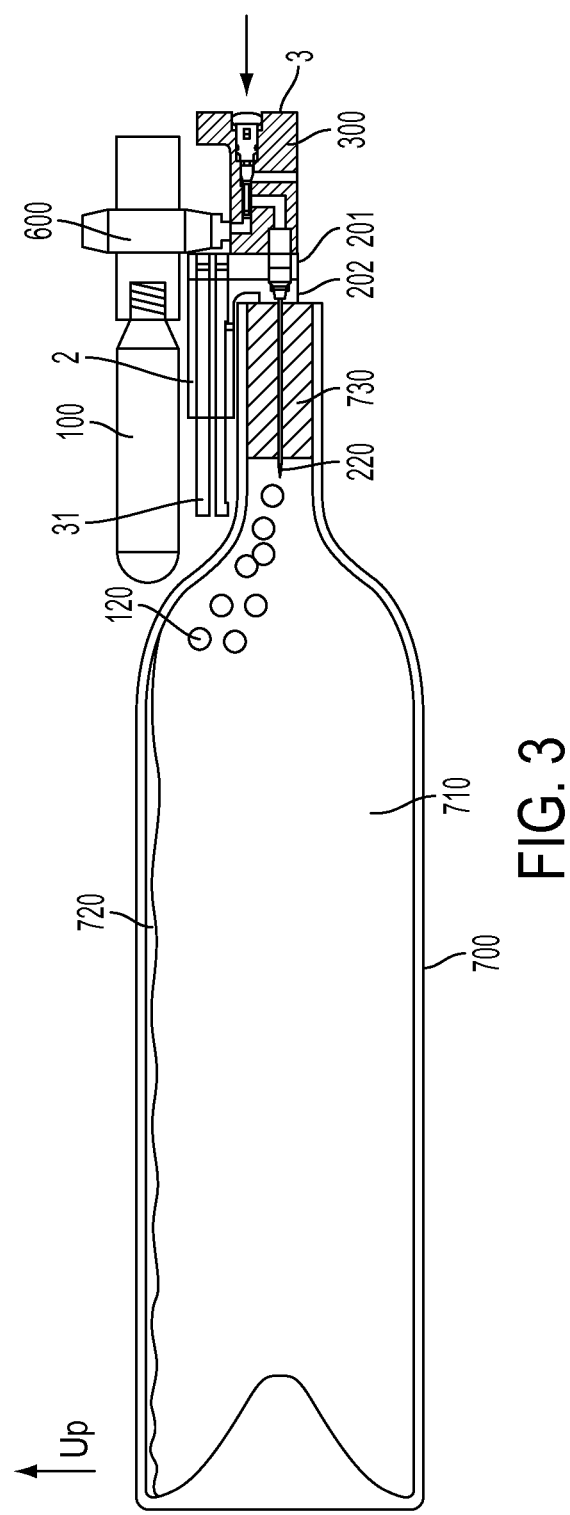
FIG. 3 shows the FIG. 1 embodiment while introducing gas into the container.
Figure 4:
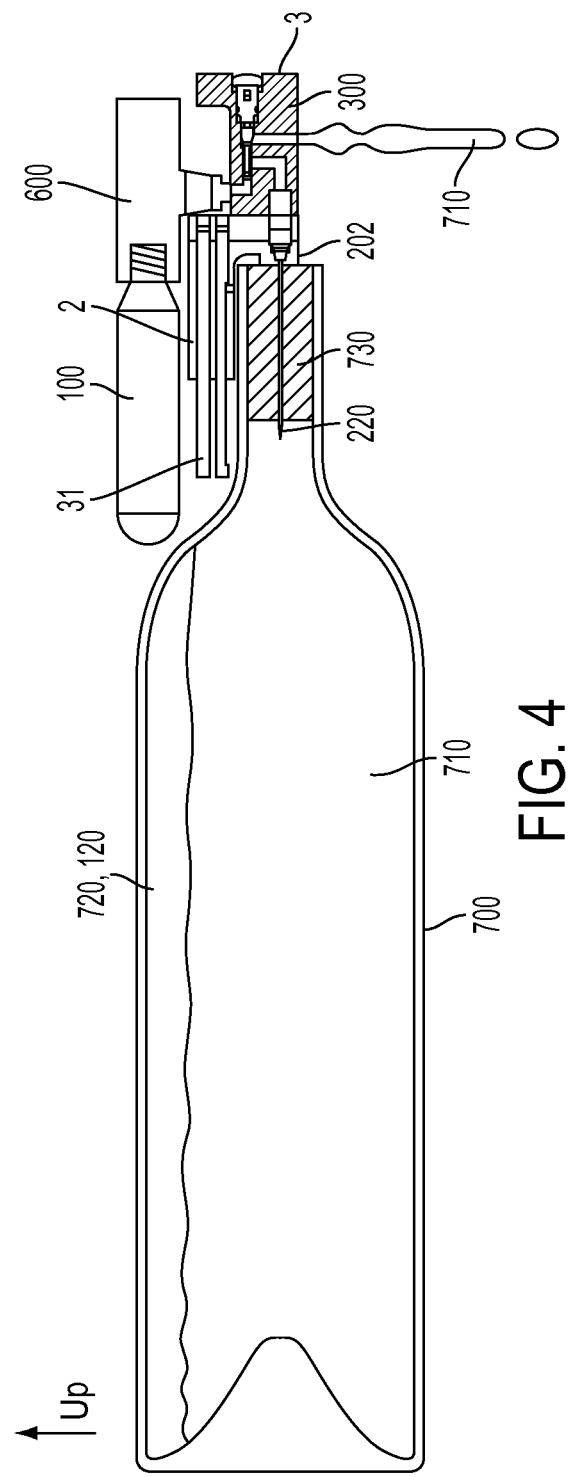
FIG. 4 shows the FIG. 1 embodiment while dispensing beverage from the container.

To insert the needle 200 through the closure 730, a user may push downwardly on the body 3 while maintaining the base 2 and the container 700 at least somewhat stationary relative to each other. The needle 200 will pass through the closure 730, guided in its motion, at least in part, by the guided motion of the body 3 relative to the base 2 (e.g., by the rails 31 and channels 21). With the needle 200 suitably inserted as shown in FIG. 2, a needle opening 220 at the needle tip may be positioned below the closure 730 and within the enclosed space of the container 700. The container 700 may then be tilted, e.g., so that the beverage 710 flows to near the closure 730 and any air or other gas 720 in the container 700 flows away from the closure. Pressurized gas 120 may then be introduced into the container 700 by actuating the valve 300 and causing gas from the cylinder 100 to flow through the valve 300 and needle 200 to exit at the needle opening 220, as shown in FIG. 3. Thereafter, the valve 300 may be operated to stop the flow of pressurized gas and allow beverage 710 to flow into the needle opening 220 and through the needle 200 to be dispensed from the valve 300, as shown in FIG. 4.

Figure 5:
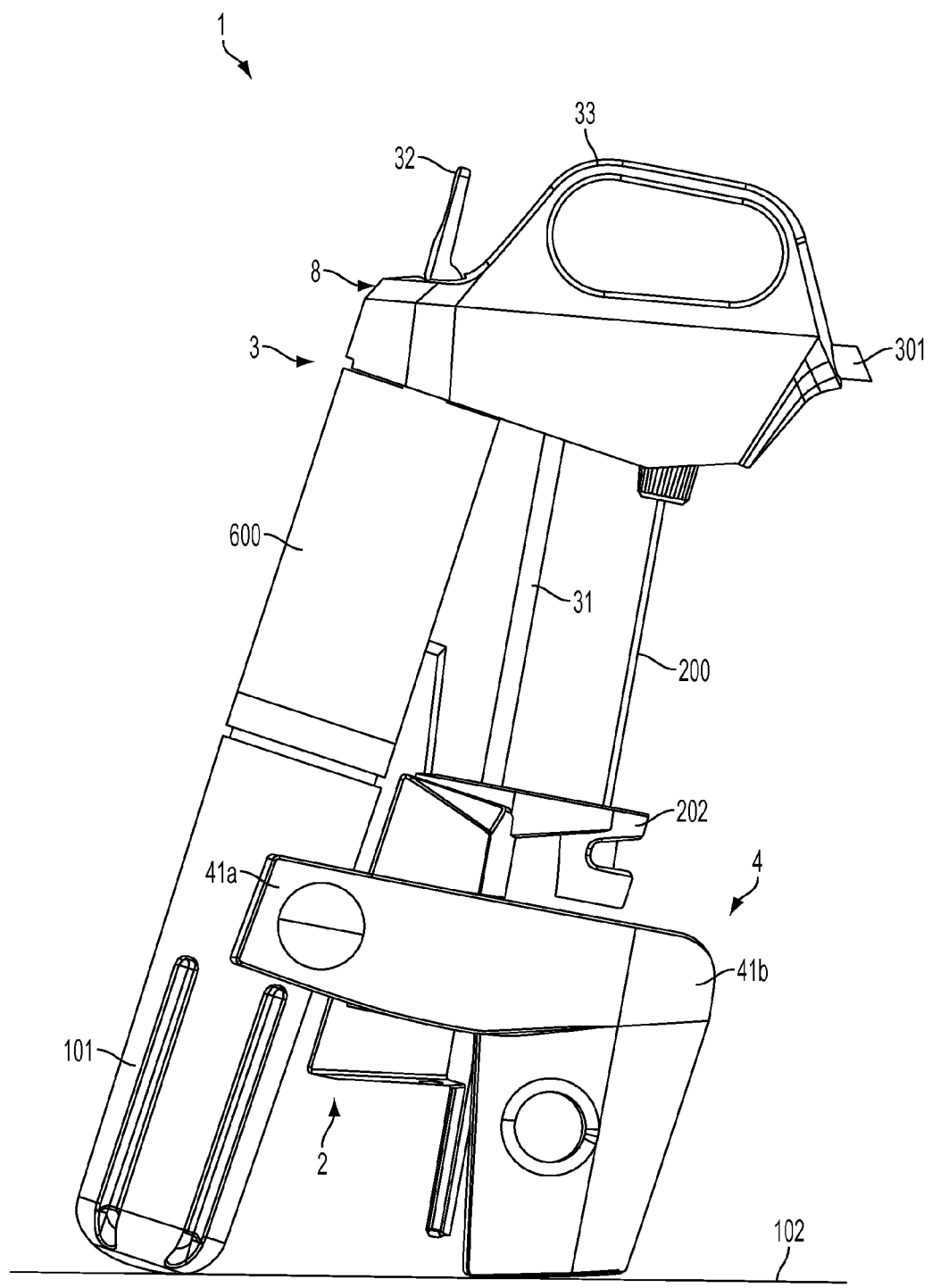
FIG. 5 shows a side view of a beverage extraction device having a clamp arrangement for supporting the device in an upright orientation in an illustrative embodiment.
Figure 6:
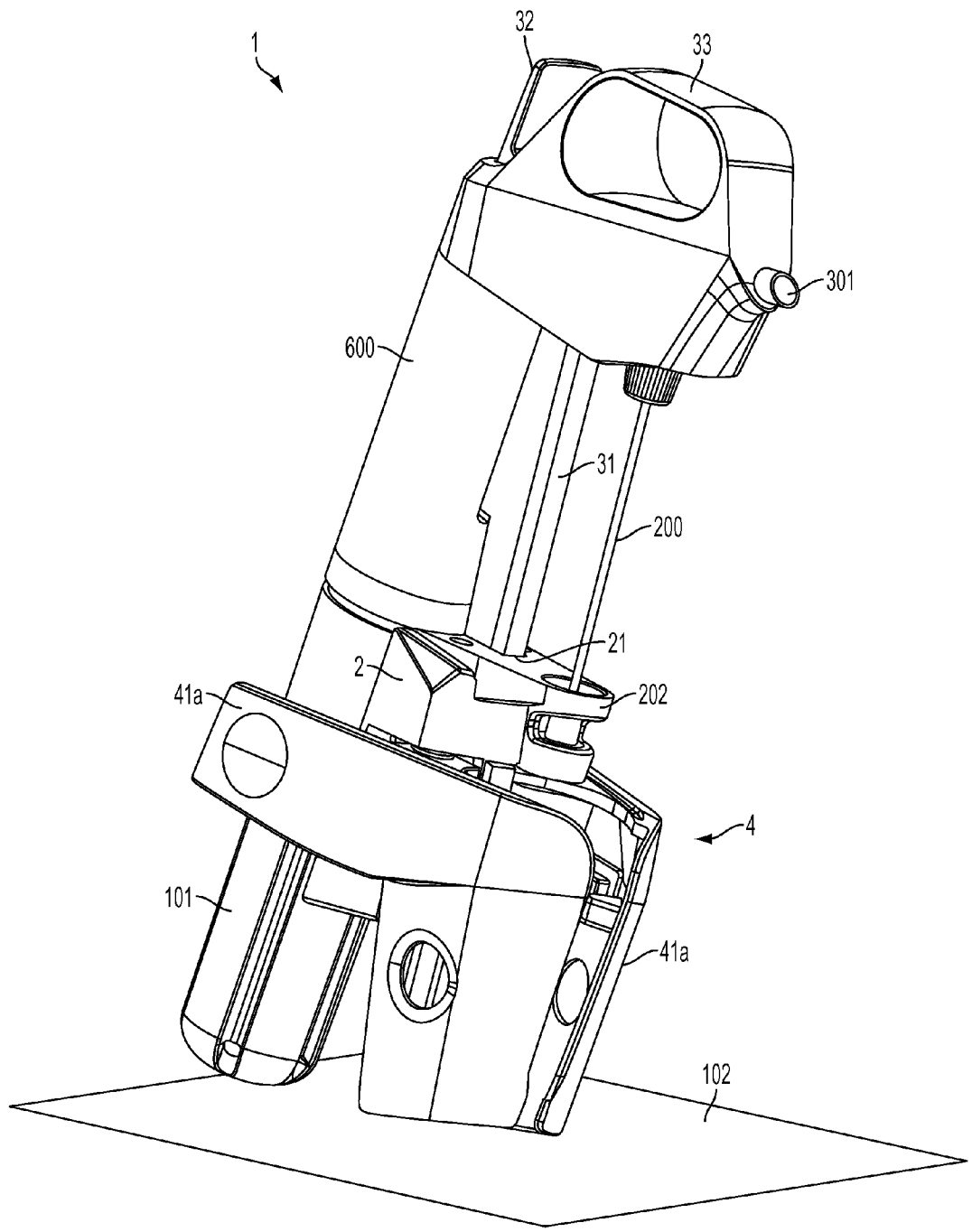
FIG. 6 shows a front perspective view of the FIG. 5 embodiment.
Figure 7:
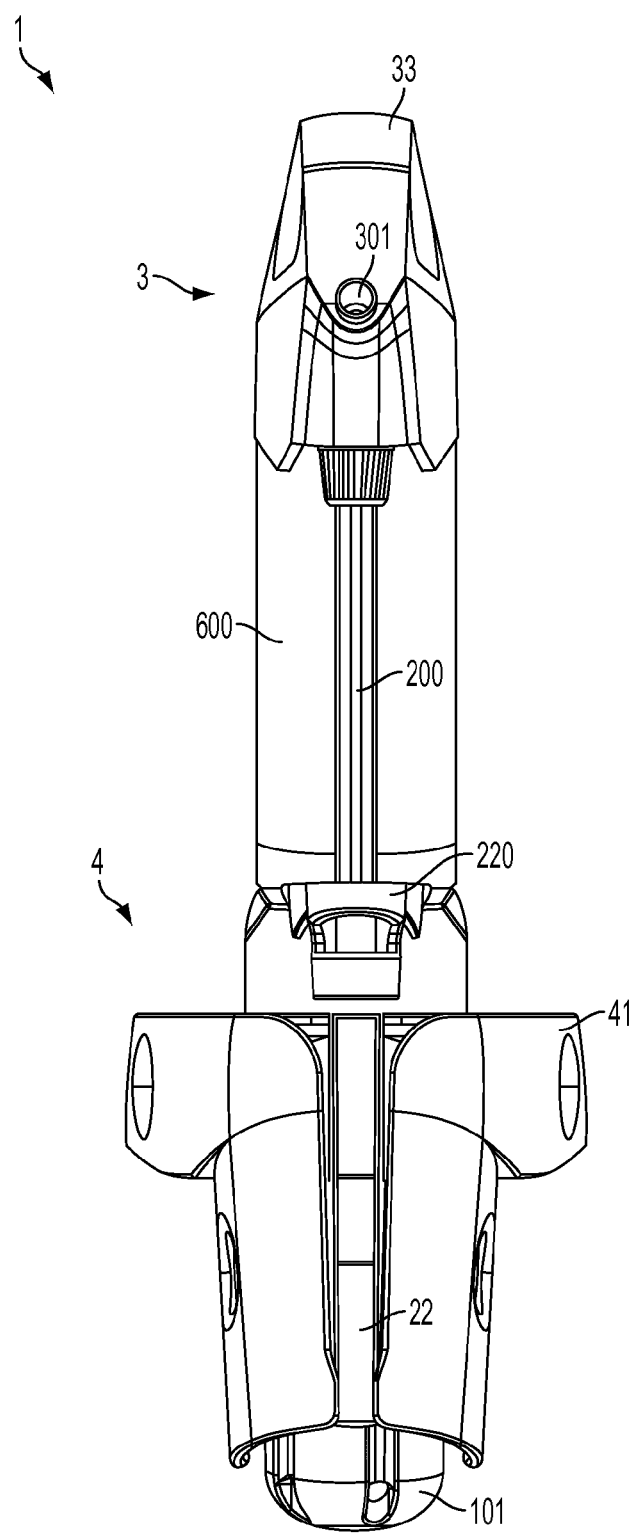
FIG. 7 shows a front view of the FIG. 5 embodiment.

FIGS. 5-7 show another illustrative embodiment of a beverage extraction device 1 that may incorporate aspects of the invention. This embodiment is similar in operation to that of FIGS. 1-4, but has a few different features including a valve for controlling gas and beverage flow. In this embodiment, the body 3 includes a handle 33, that may be gripped by a user for moving the body 3 relative to the base 2 in upward and downward motions to insert a needle 200 through a cork or other closure of a container 700. Also, a lever 32 is provided for operating the valve 8, e.g., to dispense beverage from an outlet 301 and/or deliver gas to the container 700 via the needle 200. To allow movement of the body 3 relative to the base 2, the body 3 includes a rail 31 that has T-shaped cross section, and is arranged to move within a T-shaped receiving slot or channel 21 of the base 2. As discussed above, however, other arrangements are possible for engaging the body 3 and base 2 while allowing for movement of the needle 200. Also, a gas cylinder cover 101 threadedly engages with the body 3 at the regulator 600 to engage and hold the cylinder 100 in place relative to the body 3. (A gas cylinder cover 101 in this embodiment is a kind of cap that covers the gas cylinder 100 and threadedly engages with another part of the body 3 to hold the gas cylinder 100 in place.) This arrangement of a gas cylinder cover 101 allows for the use of gas cylinders 100 that do not threadedly engage with the regulator 600, but rather are held in engagement with the regulator 600 by the cover 101.

Also included in this embodiment is a clamp 4 having a pair of clamp arms 41 that are arranged to support the device 1 in an upright orientation on a flat, horizontal surface 102, such as a table or counter top. In this embodiment, a lowermost portion of the clamp arms 41 contacts the surface 102 along with a lowermost portion of the body 3, which in this example is a lower end of gas cylinder cover 101. Thus, the clamp arms 41 and cover 101 may provide three points of contact with the surface 102, although additional points of contact may be provided. Also, the cover 101 need not contact the surface 102, and instead other portions of the body 3 or the base 2 may contact the surface 102 to support the device 1 in an upright orientation. In another arrangement, the clamp arms 41 alone may contact the surface 102 and support the device 1. For example, the clamp arms 41 may include "feet" or other structure that contacts the surface 102 to suitably support the device 1 without assistance from other parts of the device 1.

It has been found that needles having a smooth walled exterior, pencil point or Huber point needle of 16 gauge or higher are effective to penetrate through a wine bottle cork or other closure, while sealing effectively with the cork to prevent the ingress or egress of gases or fluids during beverage extraction. Moreover, such needles allow the cork to reseal after withdrawal of the needle, allowing the container and any remaining beverage to be stored for months or years without abnormal alteration of the beverage flavor. Further, such needles may be used to penetrate a foil cover or other wrapping commonly found on wine bottles and other containers. Thus, the needle may penetrate the foil cover or other element as well as the closure, eliminating any need to remove the foil or other wrapping prior to beverage extraction. Other needle profiles and gauges are also usable with the system.

A needle used in a beverage extraction device may be a smooth exterior walled, cylindrical needle with a non-coring tip that can be passed through a cork without removing material from the cork. One non-coring tip is a pencil-tip that dilates a passageway through the cork, although deflected-tip and stylet needles have also been found to work properly and could be used in alternative embodiments. The pencil-tip needle preferably has at least one lumen extending along its length from at least one inlet on the end opposite the pencil-tip and at least one outlet proximal to the pencil-tip. As shown above, a needle outlet may be positioned in the side-wall of the needle at the distal end of the needle, although proximal of the extreme needle tip.

With the correct needle gauge, it has been found that a passageway (if any) that remains following removal of the needle from a cork self-seals against egress or ingress of fluids and/or gasses under normal storage conditions. Thus, a needle may be inserted through a closure to extract beverage, and then be removed, allowing the closure to reseal such that beverage and gas passage through the closure is prevented. While multiple needle gauges can work, preferred needle gauges range from 16 to 22 gauge, with an optimal needle gauge in some embodiments being between 17 and 20 gauge. These needles gauges may offer optimal fluid flow with minimal pressures inside the container while doing an acceptably low level of damage to the cork even after repeated insertions and extractions.

Multiple needle lengths can be adapted to work properly in various embodiments, but it has been found that a minimum needle length of about 1.5 inches is generally required to pass through standard wine bottle corks. Needles as long as 9 inches could be employed, but the optimal range of length for some embodiments has been found to be between 2 and 2.6 inches. The needle may be fluidly connected to the valve directly through any standard fitting (e.g. NPT, RPT, Leur, quick-connect or standard thread), via a custom fitting or thread arrangement, or alternatively may be connected to the valve through an intervening element such as a flexible or rigid tube. When two or more needles are used, the needle lengths may be the same or different and vary from 0.25 inches to 10 inches. Creating distance between the inlet/outlets of the needles can prevent the formation of bubbles.

In some embodiments, a suitable gas pressure is introduced into a container to extract beverage from the container. For example, with some wine bottles, it has been found that a maximum pressure of between around 40 and 50 psi may be introduced into the bottle without risking leakage at, or ejection of, the cork, although pressures of between around 15 and 30 psi have been found to work well. These pressures are well tolerated by even the weakest of cork-to-bottle seals at the bottle opening without causing cork dislodging or passage of liquid or gas by the cork, and provide for relatively fast beverage extraction. The lower pressure limit in the container during wine extraction for some embodiments has been found to be between about 0 and 20 psi. That is, a pressure between about 0 and 20 psi has been found needed in a bottle to provide a suitably fast extraction of beverage from the bottle. In one example using a single 17 to 20 gauge needle, a pressure of 30 psi was used to establish an initial pressure in a wine bottle, and rapid wine extraction was experienced even as the internal pressure dropped to about 15-20 psi.

The source of pressurized gas can be any of a variety of regulated or unregulated pressurized gas containers filled with any of a variety of non-reactive gasses. In a preferred embodiment, the gas cylinder contains gas at an initial pressure of about 2000-3000 psi. This pressure has been found to allow the use of a single relatively small compressed gas cylinder (e.g., about 3 inches in length and 0.75 inches in diameter) for the complete extraction of the contents of several bottles of wine. Multiple gasses have been tested successfully over extended storage periods, and preferably the gas used is non-reactive with the beverage within the container, such as wine, and can serve to protect the beverage oxidation or other damage. Suitable gases include nitrogen, carbon dioxide, argon, helium, neon and others. Mixtures of gas are also possible. For example, a mixture of argon and another lighter gas could blanket wine or other beverage in argon while the lighter gas could occupy volume within the bottle and perhaps reduce the overall cost of the gas.

The embodiment above, a single needle with a single lumen is used to introduce gas into the container and extract beverage from the container. However, in other embodiments two or more needles may be used, e.g., one needle for gas delivery and one needle for beverage extraction. In such an embodiment, the valve may operate to simultaneously open a flow of gas to the container and open a flow of beverage from the container. The needles may have the same or different diameters or the same or different length varying from 0.25 to 10 inches. For example, one needle delivering gas could be longer than another that extracts wine from the bottle. Alternately, a two lumen needle may be employed where gas travels in one lumen and beverage travels in the other. Each lumen could have a separate entrance and exit, and the exits could be spaced from each other within the bottle to prevent circulation of gas.

Figure 8:
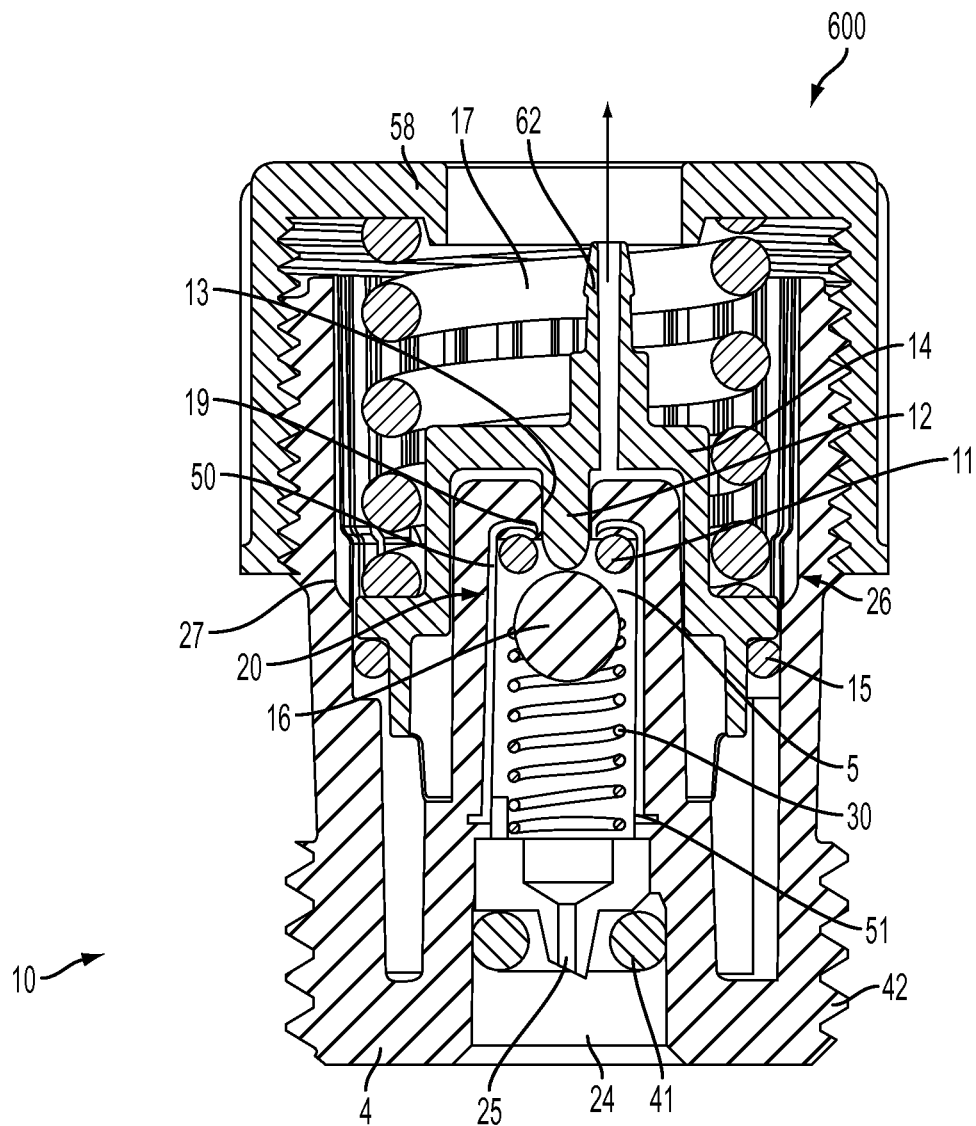
FIG. 8 shows a cross-sectional view of a gas pressure regulator in an illustrative embodiment.

As noted above, some aspects of the invention relate to features of a pressure regulator, e.g., for use in a beverage extraction device, and/or features of a lance for piercing a gas cylinder. FIG. 8 illustrates a cross sectional view of an exemplary embodiment of a pressure regulator 600 that incorporates one or more aspects of the invention and may be used with the beverage extraction devices described above. Although embodiments described herein are used with a pressurized cartridge (not shown) containing CO2 gas, other pressurized gases or fluids may be harnessed out of compressed gas cartridges such as nitrogen or oxygen. The pressure regulator includes a first stage 10 that operates to reduce the pressure from a cylinder 100 (which may be approximately 2600-3000 psi or more, or less) which is received at a receiver opening 24 and pierced by a lance 25 to cause the release of gas from the cylinder. The first stage 10 may reduce the pressure of gas received from the cylinder 100 to a first level, e.g., in a range of 30-60 psi, while an optional second stage (not shown) may reduce the pressure of gas received from the first stage 10 to a yet lower level, e.g., in a range of 15-30 psi. (A second stage may be arranged in the same basic way as the first stage 10 and have its valve chamber inlet opening fluidly connected to the gas outlet 62 of the first stage 10.) The lance 25 may be is press-fit into (or otherwise engaged with) an opening of the first stage regulator body 4, and may employ hollow and/or solid piercing lance designs. A seal between the lance 25 and the cylinder 100 may be formed using a gasket (such as an o-ring 41) that is positioned between the lance 25 and the cylinder (not shown) when the lance 25 is used to pierce the cylinder. To engage the cylinder at the receiver opening 24, the cylinder may be held in a cup (e.g., such as the cover 101 in FIG. 5) that engages with a thread 42 at the bottom of the regulator body 4 around the receiver opening 24 so that threading the cup onto the regulator body 4 pushes the neck of the cylinder into the receiver opening 24, causing the lance 25 to pierce the cylinder and a seal to be formed, e.g., by the o-ring 41, to prevent leakage of gas. U.S. Pat. No. 7,334,598 describes a cup arrangement used to engage a cylinder at a receiver opening 24.

With a cylinder received at the receiver opening 24 and pierced by the lance 25, a valve chamber 5 of the first stage regulator 10 receives relatively high pressure gas from the cylinder via a passageway through the lance 25. Flow of gas from the valve chamber 5 (through an outlet opening 13) is controlled by a valve assembly 20 that includes a spring 30 which urges a valve ball 16 upwardly into contact with a valve gasket 11, e.g., a resilient o-ring. Suitable contact of the valve ball 16 with the gasket 11 prevents the flow of gas from the valve chamber 5 through the outlet opening 13 while movement of the valve ball 16 away from the outlet opening 13 allows for flow from the valve chamber 5. Thus, movement of the ball 16 relative to (i.e., toward and away from) the gasket 11 and the outlet opening 13 can control the flow of gas from the valve chamber 5.

Movement of the valve ball 16 is controlled by a depressor 12, which is attached to a piston 14 arranged for movement in a piston bore 26 of the regulator body 4. A piston spring 17 urges the piston 14 to move downwardly in the bore 26 (and thus moves the depressor 12 and ball 16 downwardly), while gas pressure at an inner, bottom surface of the piston 14 (provided by gas emitted from the valve chamber 5 through the outlet opening 13) urges the piston 14 to move upwardly and thus moves the depressor 12 upwardly, allowing the spring 30 to move the ball 16 upwardly. A piston seal 15 is arranged to engage with a stepped surface of the piston 14 and with a tapered, stepped or other sealing surface of the piston bore 26 to control the flow of gas from an inner side of the piston 14 to outside the piston (e.g., to a space where the piston spring 17 is located). Gas in the area outside of the piston 14 is vented from the body 4 by a vent, e.g., a hole, groove or other feature 27 in the regulator body 4.

Thus, when the piston 14 is moved downwardly by the piston spring 17, flow from inside of the piston 14 is stopped by the piston seal 15 although flow from the valve chamber 5 is permitted, and when the piston 14 is moved upwardly, flow from inside the piston 14 past the piston seal 15 is permitted but flow from the valve chamber 5 is stopped. As will be understood by those of skill in the art, movement of the piston 14, and the corresponding movement of the depressor 12 and valve ball 16 as influenced by the piston spring 17 and the spring 30, respectively, will provide a pressure-regulated flow of gas from the valve chamber 5. Generally speaking, a compressive force on the piston spring 17 (and/or a spring constant of the spring 17) will define the pressure of gas released by the valve assembly 20. The spring 17 is retained in the piston bore 26 by a cap 58 which threadedly engages with the body 4 and may be adjusted in position to adjust a preload or compression force on the spring 17 to adjust a pressure of gas emitted by the first stage 10. The regulator body 4 and/or the cap 58 may include a hole or other opening to allow any gas pressure on the outer side of the piston 14 to vent.

Pressure-regulated gas flow is output from the first stage 10 via an exit conduit 62 which taps off of the top of the piston 14. The exit conduit 62 could be connected to a hose, a threaded fitting or other component which delivers the pressure-regulated gas for use, such as to a valve 300 in the device of FIGS. 1-7, for inflating a tire, driving liquid from a beverage container, or other pneumatic or hydraulic device that uses a regulated, substantially constant working pressure gas. Alternately, a pressure-regulated supply of gas may be provided by the exit conduit 62 to a second stage pressure regulator, e.g., that is arranged like the first stage regulator 10 and has its valve chamber 5 fluidly connected to the exit conduit 62.

In accordance with one aspect of the invention, a valve body that defines a valve chamber in a pressure regulator may be a metal component that is positioned in a cavity of a molded plastic regulator body. For example, in one embodiment, the valve body may be co-molded with the regulator body. Such an arrangement may allow the regulator body to be made of relatively light and less robust material, such as a plastic material, while still enabling the regulator to handle relatively high pressures, such as 1000, 2000, 3000 psi or more. That is, since only the valve chamber of the regulator may be exposed to relatively high pressures received from a gas cylinder or other source, only the valve body that defines the valve chamber need be made to withstand relatively high pressures. Components downstream of the valve body are not exposed to such high pressures, e.g., because the regulator may control opening/closing of the regulator valve so that pressures downstream of the valve may be maintained below a desired threshold, e.g., below 50, 60 100 psi or less. As a result, components downstream of the valve chamber may be required to withstand much lower pressures, e.g., below 100 psi.

FIG. 8 shows an embodiment in which the valve assembly 20 includes a valve body 50 that defines the first valve chamber 5. The valve body 50 is formed as a generally cylindrical element with a radially inwardly extending annular end wall that defines the outlet opening 13, and a radially outwardly extending flange at the inlet opening 51 of the valve chamber 5. The annular end wall may provide a seal engaging surface to engage with the gasket 11 and form a seal to help resist leakage of gas from the valve chamber 5 when the valve ball 16 is engaged with the gasket 11. In this embodiment, the inner surface of the annular end wall of the valve body 50 has a curved shape that at least partially approximates a shape of the gasket 11, e.g., a partial toroidal shell shape arranged to work with an o-ring gasket 11, but may have any suitable shape. Also, the size of the outlet opening 13 may be arranged in relation to the size of the depressor 12 to help resist movement of the gasket 11 through the outlet opening 13. For example, the depressor 12 may have a size and shape that is similar to the outlet opening 13, thus helping prevent movement of the gasket 11 through the opening 13. The valve body 50 in this embodiment includes a flange at the inlet opening 51 end to help maintain a position of the body 50 in a cavity of the regulator body 4, but such a flange or other feature is not required. The thickness of the valve body 50 may be any suitable value, and may be arranged to withstand the expected pressures, such as 2000 psi or more.

Figure 9:
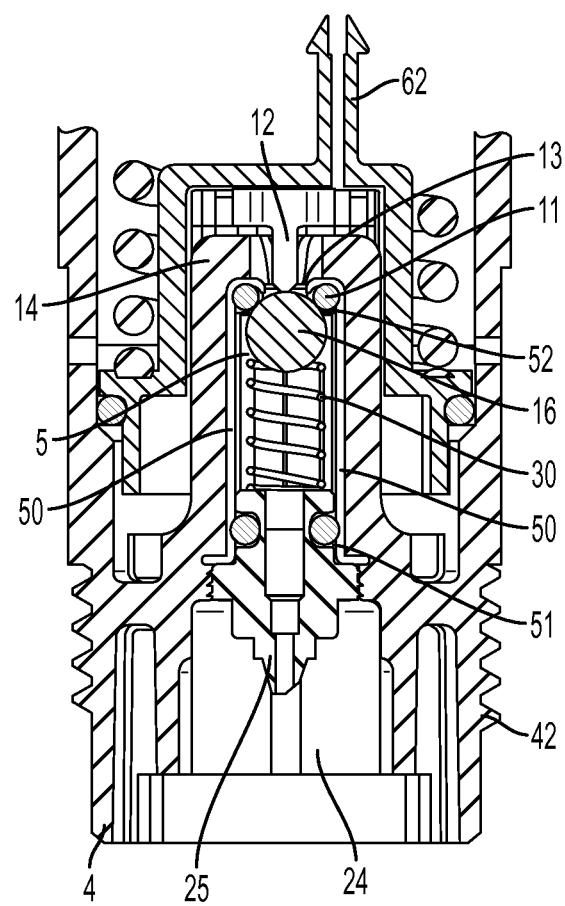
FIG. 9 shows a cross-sectional view of another gas pressure regulator in an embodiment having a lance portion received into a valve body.
Figure 10:
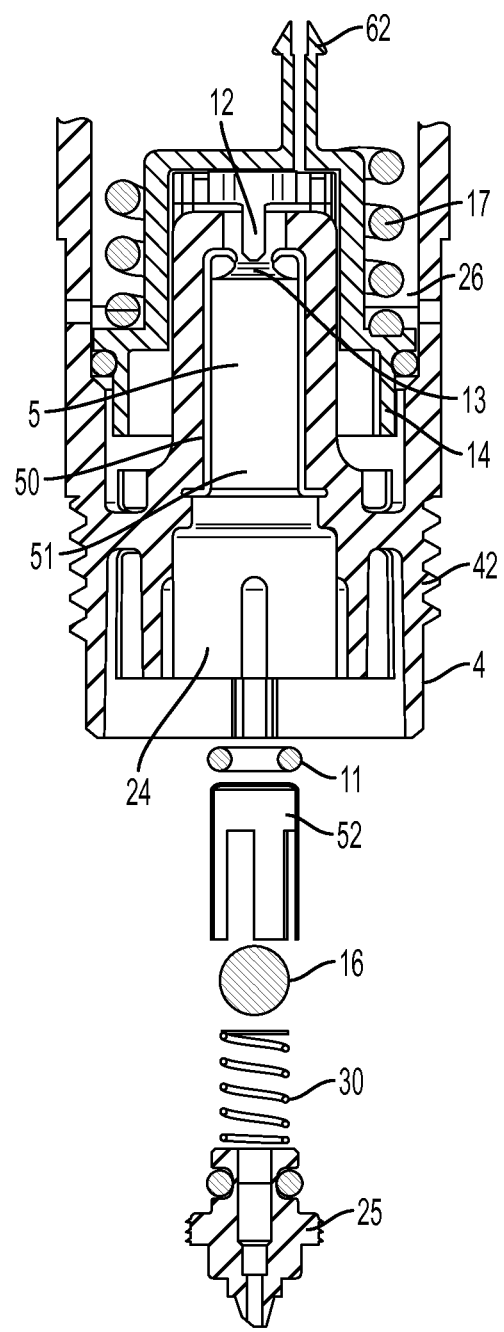
FIG. 10 shows an exploded view of the FIG. 9 embodiment.

In accordance with another aspect of the invention, a gasket retainer may be provided in the valve chamber to help hold the valve gasket at the outlet opening. In one arrangement, the gasket retainer may be formed as part of the valve body, or may be provided by a separate element positioned in the valve chamber. FIGS. 9 and 10 show an illustrative embodiment of a pressure regulator 600 that is arranged similar to that in FIG. 8, but in this embodiment a gasket retainer 52 is provided in the valve chamber 5. While the gasket retainer 52 is arranged as a separate element from the valve body 50, the gasket retainer 52 could be formed as part of the valve body 50, e.g., as an inwardly extending flange, wall, protrusion or other element attached to the inner wall of the body 50. In this embodiment, the gasket retainer 52 includes a cylindrical shell portion and an inwardly extending flange at a gasket end of the retainer 52 arranged to contact and hold the valve gasket 11 near the outlet opening 13. The gasket retainer 52 is maintained relatively stationary in position in the valve chamber relative to the first valve body 50, but in some embodiments may be permitted to move to some extent. While the gasket retainer 52 could be held in place in different ways, in this embodiment the gasket retainer 52 contacts a portion of the lance 25 which is received into the inlet opening 51 of the valve body 50. That is, an end of the gasket retainer 52 near the inlet opening 51 contacts a portion of the lance 25 in the valve body 50 so that the flange of the gasket retainer 52 is held in place relative to the outlet opening 13. Of course, other arrangements are possible, such as welding, adhering or otherwise fixing the gasket retainer 52 in place relative to the valve body 50.

Assembly of the gasket retainer 52 in the valve body 50 is shown in FIG. 10. As noted above, the valve body 50 may be molded into the regulator body 4 or otherwise positioned in a cavity of the regulator body 4 so that the inlet opening 51 of the valve body 50 is exposed at the receiver opening 24. The gasket 11 may be inserted into the valve chamber 5 through the inlet opening 51, followed by the gasket retainer 52, the valve ball 16, the valve spring 30 and the lance 25. As can be seen in FIG. 10, the lance has a rear end that is sized and configured to fit into the inlet opening 51 of the valve body 50 and form a gas-tight seal with the valve body 50. In this embodiment, the lance 25 includes an o-ring gasket received in a groove of the rear end of the lance 25 to form a seal with the valve body 50, although other arrangements are possible, such as a sealant, welding, adhesive, a threaded connection, a compression fitting, etc. As can also be seen in FIG. 10, the gasket retainer 52 in this embodiment includes two or more legs that extend toward and contact the lance 25 to position the gasket retainer 52 in the valve chamber 5. Such legs are optional, however, and need not be provided.

Figure 11:
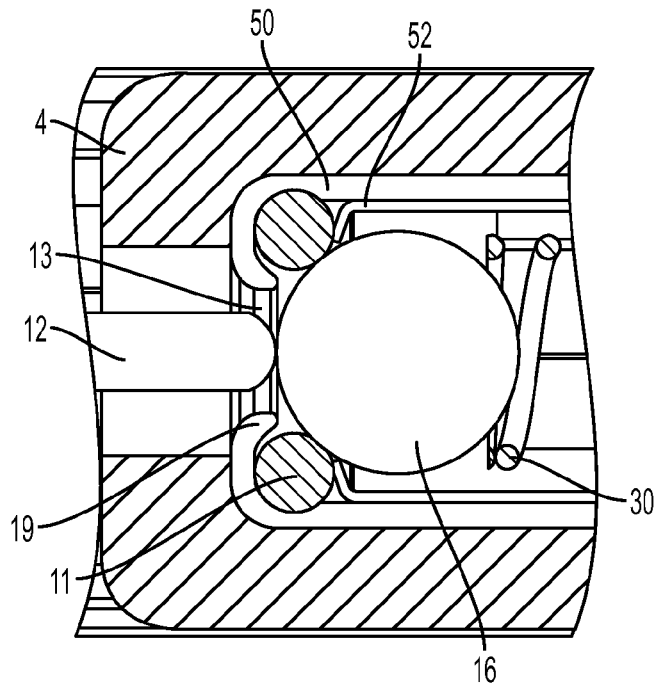
FIG. 11 shows a close up view of a valve arrangement in the FIG. 9 embodiment with a gasket in an undeformed state.
Figure 12:
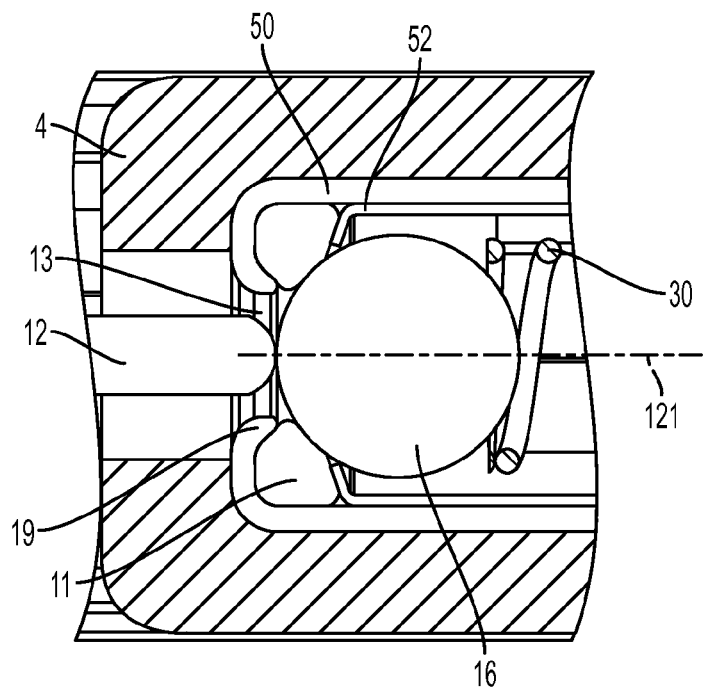
FIG. 12 shows a close up view of a valve arrangement in the FIG. 9 embodiment with a gasket in a deformed state.

FIGS. 11 and 12 illustrate how the gasket retainer 52 functions in some embodiments to restrict movement of the gasket 11 as the gasket is deformed with contact of the valve ball 16. In this embodiment, the gasket retainer 52 has a flange at the outlet opening end with an annular shape that tapers inwardly from the cylindrical shell portion. Other arrangements are possible for the gasket-contacting portion of the gasket retainer 52, such as multiple inwardly extending fingers, a flange that is perpendicular to the valve body 50 inner wall, or other arrangements. FIG. 11 shows the valve ball 16 in a closed position in which the outlet opening 13 is sealed closed by contact of the valve ball 16 with the gasket 11 and by contact of the gasket 11 with the valve body 50 at the outlet opening 13. However, FIG. 11 illustrates generally how the gasket 11 would move if unrestrained by the valve body 50 and the gasket retainer 52. FIG. 12, in contrast, shows the valve ball 16 in the closed position but with the gasket 11 in its deformed state and restrained by the valve body 50 and the gasket retainer 52. As can be seen, the gasket 11 is resilient and generally conforms to the shape of the valve body 50 and the retainer 52 when pressed by the valve ball 16. Though not shown, in the absence of the retainer 52, the gasket 11 would tend to deform in a direction away from the outlet opening 13 and into a space between the valve ball 16 and the valve body 50. However, the gasket retainer 52 prevents this movement, and as a result, the contact force between the gasket 11 and the valve ball 16 is effectively increased. In some embodiments, the valve gasket 11 and the gasket retainer 52 are arranged to prevent contact of the valve ball 16 with the valve body 50 near the outlet opening 13. For example, the valve body 50 in this embodiment curves inwardly at the outlet opening 13 so that the valve body extends somewhat inwardly into the valve chamber 5 at the outlet opening 13 to a valve seat 19. While in some cases the valve ball 16 may be permitted to contact the valve body 50 at the valve seat 19, in this embodiment, the gasket 11 and the gasket retainer 52 are arranged so that the valve ball 16 cannot contact the valve body 50 at the valve seat 19. Instead, the gasket 11 prevents the valve ball 16 from moving into contact with the valve body 50, e.g., because deformation of the gasket 11 is limited by the gasket retainer 52 and the valve body 50 such that the gasket 11 effectively becomes a rigid body before the valve ball 16 contacts the valve seat 19. By preventing contact of the valve ball 16 with the valve body 50 at the valve seat 19, damage to the ball 16 and/or body 50 can be resisted, e.g., due to contact of the two relatively hard metal elements, which may be made of stainless steel or other suitable material, with each other. Moreover, noise associated with the contact as the valve closes may be reduced or eliminated.

In some embodiments, a gap between the gasket retainer 52 and the valve ball 16 and/or a gap between the valve seat 19 and the valve ball 16 with the ball 16 at the closed position in FIG. 12 may be suitably sized (i.e., suitably small) to help prevent the gasket 11 from deforming (e.g., extruding) into the respective gap. This can help prevent damage to the gasket 11 and/or seal failure. In some embodiments, the gap width may be 0.5 to 2 millimeters or less. While in this embodiment the gasket 11 is an o-ring having a durometer of Shore A 90, other arrangements for the gasket are possible, and higher durometer gaskets may allow for a larger gap between the valve ball 16 and the valve seat 19 or gasket retainer 52.

Another aspect of the invention illustrated in FIGS. 11 and 12 is that the depressor 12 of the valve piston 14 may include a rigid, convex contact surface arranged to contact the valve ball 16. This is in contrast to a contact surface that is flat, concave and/or resilient, e.g., formed by a rubber ball, concave or flat metal surface, or other similar element at the end of the depressor 12. By using a rigid, convex contact surface on the depressor 12 (such as a spherical surface), the depressor 12 may urge the valve ball 16 to move away from the outlet opening 13 in a direction that is at an angle to the direction of movement of the depressor 12. For example, as shown in FIG. 12, the depressor 12 may move along a line 121 with movement of the piston 14. However, since the depressor 12 and the ball 16 contact each other at spherical or other convex, the depressor 12 may move the ball 16 away from the outlet opening 13 in a direction that is at an angle to the line 121. That is, since the depressor 12 and valve ball 16 contact each other at convex surfaces, the depressor 12 does not restrain movement of the ball 16 in directions transverse to the line 121. As a result, and since the spring 30 and valve body 50 may permit lateral movement of the valve ball 16, the valve ball 16 is free to move laterally (in a direction transverse to the line 121) when pushed away from the outlet opening 13 by the depressor 12. This is true whether the depressor 12 contacts the valve ball 16 at a point where a diameter line of the ball 16 is parallel to the line 121 or not. In fact, by positioning the point of contact of the depressor 12 with the valve ball 16 at a location where a diameter of the ball 16 is parallel to the line 121, wear of the gasket 11 may be more evenly spread to different areas of the gasket 11. That is, if the point of contact between the depressor 12 and the ball 16 is positioned away from a diameter line that is parallel to the line 121, the ball 16 may be consistently moved in a direction transverse to the line 121, but may be moved along a same or similar track every time the valve opens and closes. This may cause the gasket 11 to wear along the track faster than other portions of the gasket 11. However, by positioning the point of contact between the depressor 12 and the ball 16 at a diameter line that is parallel to the line 121, the ball 16 may be moved along different, random tracks, allowing the gasket 11 to wear more evenly.

As a result of moving the valve ball 16 in a direction transverse to the line 121 away from the outlet opening 13, the ball 16 may move so as to break contact with the gasket 11 at one side of the ball 16 before an opposite side of the ball 16 moves away from the gasket 11. This type of movement allows the valve to open and/or close more smoothly, reducing a chattering or hammering noise that may be caused by the valve quickly opening and closing while transitioning from open to closed (or vice versa). That is, in arrangements where the ball 16 moves linearly away from the gasket 11, the ball 16 tends to maintain contact with the gasket at a circular area (and thus maintain a seal with the gasket 11) until the ball 16 completely breaks free of the gasket 11. This abrupt opening of the valve can allow gas to flow abruptly through the outlet opening 13, which tends to bias the piston 14 away from the valve 20. As a result, the depressor 12 may be moved out of the opening 13, allowing the ball 16 to again contact the gasket 11 and form a complete seal, closing the valve. This drops the pressure on the inner surface of the piston 14, allowing the spring 17 to move the piston 14 so the depressor 12 again moves the ball 16 to open the valve 20. This rapid cycling between valve open/closed can cause the ball 16 to rapidly move between open and closed positions, creating a chattering or hammering noise. However, by having the ball 16 move away from the gasket 11 in a direction that is transverse to the line 121, the valve 20 may more gradually open, helping to prevent the abrupt pressure changes that may cause the piston to rapidly move between open and closed positions. As a result, chattering or hammering of the valve may be reduced or eliminated.

In another aspect of the invention, the depressor 12 may include flutes or other flow channels along its length to help reduce resistance to flow through the outlet opening 13. That is, in some embodiments, the depressor 12 may have a size and shape that is similar to the outlet opening 13, e.g., to help reduce a likelihood of the gasket 11 being extruded through the outlet opening 13 with strong gas flow out of the valve chamber 5. However, to help reduce flow resistance through the outlet opening 13, the depressor 12 may include flow channels, such as flutes that run along a length of the depressor 12, to help reduce a resistance to flow out of the outlet opening 13. Other arrangements are possible, such as holes, depressions or other features in the depressor 12.

Another aspect of the invention relates to providing a piercing lance with a front piercing end that is arranged to help reliably pierce gas cylinders while reducing the chance that a flap or other portion of the cylinder closure is formed during the piercing process that prevents or reduces flow from the cylinder. That is, most gas cylinders of the type described above include a relatively thin metal closure (sometimes referred to as a cap) that is intended to be pierced to open the cylinder. With some lance arrangements, the cylinder closure can be pierced in such a way that a portion of the closure blocks an opening of the lance, preventing the exit of gas from the cylinder. In one illustrative embodiment, a piercing lance may include a tapered portion with first and second surfaces that define an opening at the distal end of the tapered portion and are arranged to help prevent blockage of the opening by a portion of a cylinder closure. The first and second surfaces may each be arranged in respective first and second planes that are at an angle of 20-35 degrees relative to each other. By having the distal end of the tapered portion arranged in two different planes, the lance may piece a gas cylinder in a way that helps prevent the formation of a flap or other part that may occlude the opening of the lance. For example, the first surface may be arranged in a plane that is perpendicular to a longitudinal axis of the tapered portion of the lance, while the second surface may be arranged in a plane that is transverse and non-perpendicular to the longitudinal axis, e.g., at an angle of 55-70 degrees to the longitudinal axis. Such an arrangement may allow the first surface to initially cut an arc in a gas cylinder closure, while the second surface may function to fold the cut portion of the cylinder closure away from the opening of the lance. This is in contrast to other lance arrangements that have a leading face of the lance arranged in a single plane, whether in a plane that is perpendicular or other angle transverse to a longitudinal axis of the lance. Such arrangements have been found in some circumstances to deform and/or cut the gas cylinder closure so that a flat portion of the closure is positioned over the opening of the lance. With flow of gas out of the cylinder and into the lance opening, the flat portion of the closure has been found to cover the opening, blocking flow into the opening. In contrast, arranging the lance as described above to have two leading faces (or more) that are at an angle to each other may help avoid this problem, whether by preventing the complete cutting of a part of the cylinder closure and/or providing a non-planar leading face of the lance over which a cylinder closure portion may be positioned to block flow.

Figure 13:
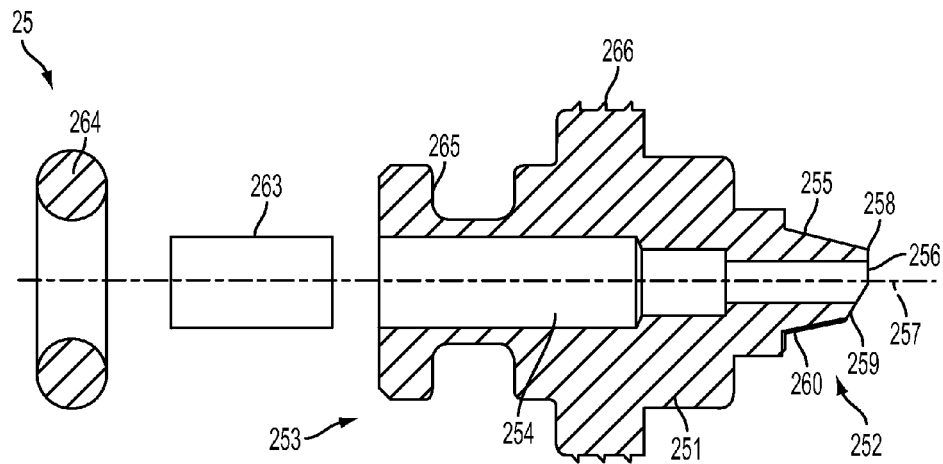
FIG. 13 shows an exploded, cross sectional view of a lance employed in the FIG. 9 embodiment.
Figure 14:
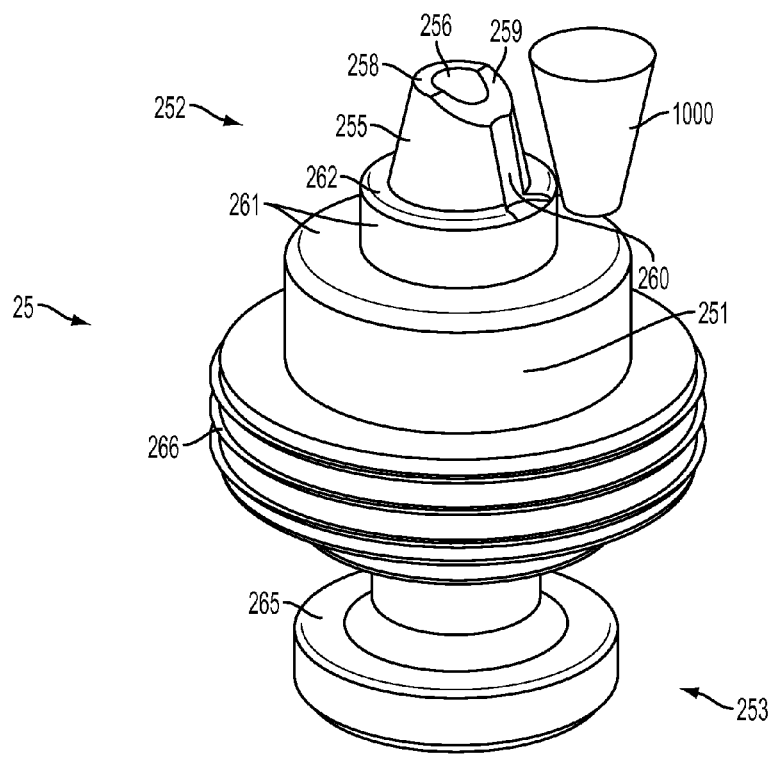
FIG. 14 shows a perspective view of the FIG. 13 lance.

FIG. 13 shows an exploded cross sectional view and FIG. 14 shows a perspective view of a lance that incorporates aspects of the invention mentioned above. The lance 25 in this embodiment includes a body 251 with a front piercing end 252, a rear end 253 opposite the front piercing end, and a fluid passageway 254 extending between the front piercing end and the rear end. The front piercing end 252 includes a tapered portion 255 having an opening 256 at a distal end of the tapered portion 255 and a longitudinal axis 257. The opening 256 may have a size of about 1-3 mm. The tapered portion 255 has a first surface 258 partially defining the opening 256 at the distal end that is arranged in a plane perpendicular to the longitudinal axis 257 and a second surface 259 partially defining the opening 256 at the distal end that is arranged in a plane transverse and not perpendicular to the longitudinal axis 257. (A plane perpendicular to the longitudinal axis 257 need not be exactly 90 degrees to the longitudinal axis 257, but rather may be +/−5 degrees of 90 degrees to the axis.) In one embodiment, the second surface may be arranged in a plane that is at an angle of 55-70 degrees to the longitudinal axis 257 (measured as the smallest angle between the plane and the longitudinal axis). A line that extends along a junction or area where the first and second surfaces 258, 259 meet may pass through the opening 256. For example, in one embodiment the line extending along an area where the first and second surfaces meet passes through a center of the opening 256, although the line may define a chord of the opening 256 that does not pass through the center. The tapered portion may have an outer surface arranged at an angle to the longitudinal axis 257 as well, e.g., the outer surface may be frustoconical and arranged at an angle of 10-30 degrees to the longitudinal axis 257.

The rear end 253 of the lance 25 may include a groove 265 or other feature to receive a gasket 264 which is arranged to provide a seal between the lance 25 and the valve body 50 when the rear end of the lance 25 is received into the inlet opening 51 of the valve body 50 as shown in FIG. 9. Barbs or other features 266 on the lance body 251 may engage with the regulator body 4 to help hold the lance 25 in place relative to the valve body 50 and the regulator body 4. An optional filter 263 may be provided in the passageway 254, e.g., to help prevent relatively large particles from entering the valve chamber 5. The filter 263 in this embodiment may be a solid, porous body (e.g., made of stainless steel and having 30 micron pores), but may be arranged in other ways such as a screen, membrane, etc. The filter 263 may be press fit into the passageway 254 and/or plastically deformed (e.g., by a punch) to help ensure the filter 263 remains firmly in the passageway 254.

In accordance with another aspect of the invention, the outer surface of the tapered portion may include a vent channel that extends from the first or second surface at the distal end to a proximal end of the tapered portion. For example, FIGS. 13 and 14 show a vent channel 260 that is provided in the outer surface of the tapered portion 255. In this embodiment, the vent channel 260 may be formed by a tapered milling tool (shown schematically at reference number 1000) although other arrangements are possible. A vent channel 260 like that shown in FIGS. 13 and 14 may provide one or more benefits including: 1) indicating that piercing of a gas cylinder has been successful, 2) helping to prevent complete cutting of a flap or other piece from the gas cylinder closure during piercing, and/or 3) help provide venting of the gas cylinder if an attempt is made to remove the cylinder from the regulator 600 prior to complete emptying of the cylinder. The vent channel 260 may indicate successful piercing of a cylinder by allowing for leakage of gas from the cylinder through the vent channel 260 before a gasket (such as a gasket 41 shown in FIG. 8) creates a seal between a sealing surface 261 of the lance 25 and the gas cylinder when the gas cylinder is fully seated in the receiver opening 24. That is, the tapered surface 255 typically provides at least a temporary seal between the lance 25 and the gas cylinder closure during piercing, but the vent channel 260 may provide a leak path that allows gas to leak before a seal is made at the sealing surface 261. This leaking may be temporary and audible to the user, indicating that the cylinder was successfully pierced (indicated by the audible leak sound) and that a seal was created by the gasket 41 (indicated by the stopping of the audible leak sound). In some cases the vent channel 260 may be provided along the tapered surface 255 from a distal to a proximal end of the tapered surface 255, as well as along a step 262 at the proximal end of the tapered surface 255. The step 262 may provide a stop for advancement of the gas cylinder relative to the lance 25, and by providing the vent channel 260 along the step 262 a leak path may be established even if a leading face of the gas cylinder contacts the step 262.

The vent channel 260 may also provide for venting of a gas cylinder if the cylinder is removed from the lance 25 and regulator 600 before the cylinder is completely emptied. That is, if a cylinder is only partially used, and a user removes a cap or other holder so the cylinder can be removed from the receiver opening 24, high pressure in the cylinder may cause the cylinder to be pushed off of the lance 25. In this case, the vent channel 260 may provide a leak path for gas as the cap or other holder is removed, allowing high pressure gas to escape as soon as a seal at the sealing surface 261 is broken. This may alert the user that the cylinder is not yet emptied, prompting the user to again tighten the cover 101 or wait for further removal of the cover 101 until the cylinder is fully vented.

Figure 15:
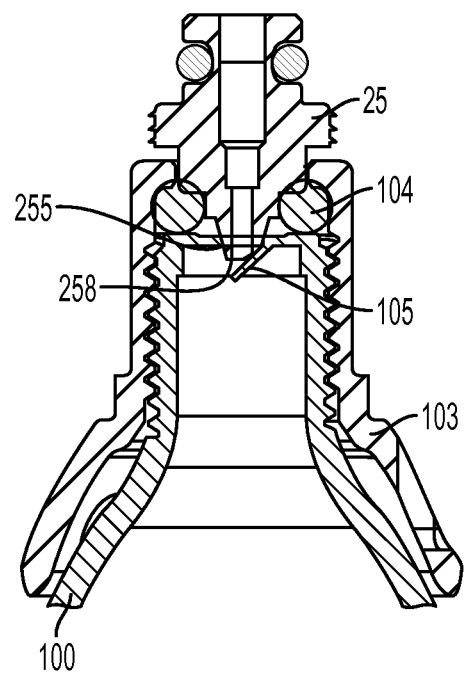
FIG. 15 shows the lance of FIG. 13 in an initial stage of piercing a gas cylinder closure.
Figure 16:
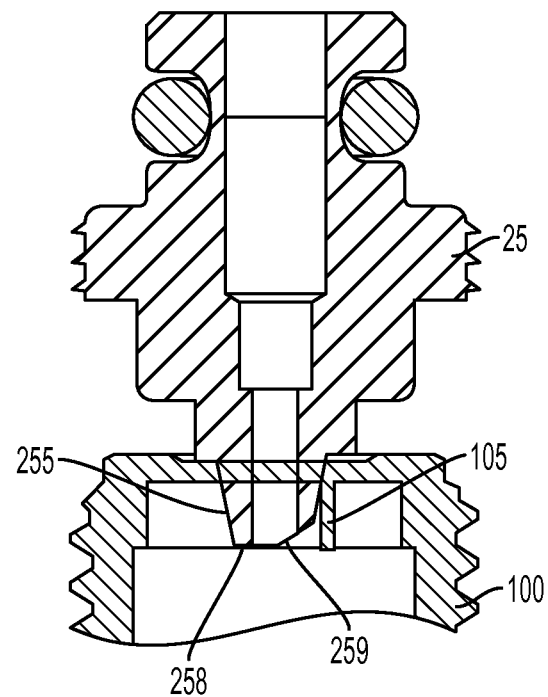
FIG. 16 shows the lance of FIG. 13 in a later stage of piercing the gas cylinder closure.

To explain how the vent channel 260 may help prevent complete cutting of a flap or other piece from a gas cylinder closure, FIGS. 15 and 16 show the lance 25 of FIGS. 13 and 14 piercing a gas cylinder 100. In FIG. 15, the lance 25 has contacted a closure of the gas cylinder 100 so that the first surface 258 of the lance 25 has cut an arcuate slot through the cylinder closure and a flap 105 portion of the closure has been formed and pushed downwardly into the cylinder. By having the first surface 258 only partially surround the opening 256, the first surface 258 cuts only an arcuate slot, not a completely circular opening. Thus, the flap 105 is formed, rather than having a complete circular piece cut from the closure. Also, since the second surface 259 is arranged at an angle to the first surface 258, the second surface 259 may serve to bend the flap 105 downwardly with or without substantial further cutting of the flap 105 from remaining portions of the closure. Moreover, the flap 105, which may be formed as a generally flat element, is less likely to block the opening 256 because the first and second surfaces 258, 259 are arranged at an angle to each other, preventing the flat flap 105 from covering the opening 256. Finally, since the vent channel 260 provides a disruption in the outer edge of the second surface 259, the vent channel 260 may help stop any further cutting of the flap 105 that is performed by the second surface 259 with advancement of the cylinder into the receiver opening 24, and instead encourage to flap 105 to remain attached to the remaining part of the cylinder closure and to bend away from the opening 256.

While a cylinder may be arranged in different ways, FIG. 15 shows an embodiment of a gas cylinder 100 that includes a gasket 104, e.g., an o-ring, captured on a leading face of the gas cylinder 100 by a cap 103 that is threadedly engaged with a neck of the cylinder 100. The lance 25 may enter an opening of the cap 103 so that the sealing surface 261 contacts the gasket 104 and a seal is formed by the gasket 104 between the leading face of the gas cylinder 100 and the sealing surface 261. The cap 103 may serve to not only keep the gasket 104 in place on the cylinder 100, but also to help restrain deformation of the gasket 104 when contacted by the lance 25. As discussed above with reference to the gasket retainer 52, by restraining deformation of the gasket 104, the cap 103 may help increase a contact force between the lance sealing surface 261 and the gasket 104, thereby providing an improved seal. In this embodiment, the sealing surface 261, or a gasket-contacting portion of the lance 25, is proximal of the tapered portion 255 and is arranged to contact the gasket 104 to create a gas-tight seal between the gasket and the lance. The sealing surface 261 includes an annular surface arranged in a plane perpendicular to the longitudinal axis 257 of the lance and a cylindrical surface that extends around the longitudinal axis 257, although other arrangements are possible.

In another aspect of the invention, the tapered portion 255 or other parts of the lance 25 that contact metal portions of a gas cylinder 100 may have a surface finish that helps reduce friction between the lance 25 and the cylinder 100 during piercing. For example, the tapered portion 255 may have a surface finish with an average roughness of 16 micro-inches or better. This surface finish has been found to help the lance 25 pierce a gas cylinder with reduced friction, with reduced likelihood that the gas cylinder will "stick" to the tapered portion 255, and with reduced deformation of the cylinder closure at the point of penetration. That is, a high surface roughness on the tapered portion 255 may cause the cylinder closure to "stick" to the tapered portion 255 during piercing such that the closure is deformed inwardly rather than being cut. By providing the tapered portion 255 with a suitable surface roughness, the cylinder closure is more likely to be cleanly cut during penetration rather than being deformed in a way similar to that in some deep drawing processes, e.g., used to form cans from metal sheets.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

The invention claimed is:

1. A piercing lance for piercing pressurized gas cylinders, comprising:
a body having a front piercing end, a rear end opposite the front piercing end, and a fluid passageway extending between the front piercing end and the rear end, the front piercing end including a tapered portion having an opening at a distal end of the tapered portion and a longitudinal axis, the tapered portion having a first surface partially defining the opening at the distal end that is arranged in a plane perpendicular to the longitudinal axis and a second surface partially defining the opening at the distal end that is arranged in a plane transverse and not perpendicular to the longitudinal axis.

2. The lance of claim 1, wherein the second surface is arranged in a plane that is at an angle of 55-70 degrees to the longitudinal axis.

3. The lance of claim 1, wherein the second surface is arranged in a plane that is at an angle of 55-60 degrees to the longitudinal axis.

4. The lance of claim 1, wherein the tapered portion has an outer surface arranged at an angle of 10-30 degrees to the longitudinal axis.

5. The lance of claim 1, wherein an outer surface of the tapered portion includes a vent channel that extends from the first or second surface to a proximal end of the tapered portion.

6. The lance of claim 1, wherein the fluid passageway extends along the longitudinal axis.

7. The lance of claim 1, wherein the body includes a gasket-contacting portion proximal of the tapered portion that is arranged to contact a gasket positioned between the lance and a gas cylinder and create a gas-tight seal between the gasket and the lance.

8. The lance of claim 7, wherein the gasket-contacting portion includes an annular surface arranged in a plane perpendicular to the longitudinal axis.

9. The lance of claim 7, wherein the gasket-contacting portion includes a cylindrical surface that extends around the longitudinal axis.

10. The lance of claim 1, wherein the opening has a size of about 1-3 mm.

11. The lance of claim 1, wherein a line extending along an area where the first and second surfaces meet passes through the opening.

12. The lance of claim 1, wherein a line extending along an area where the first and second surfaces meet passes through a center of the opening.

13. The lance of claim 1, wherein the tapered portion has a surface finish with an average roughness of about 16 micro-inches.

14. The lance of claim 1, wherein the tapered portion includes a vent channel that extends from the second surface to a proximal end of the tapered portion.

15. The lance of claim 14, wherein the vent channel extends radially outwardly from the proximal end of the tapered portion.

16. A piercing lance for piercing pressurized gas cylinders, comprising:

a body having a front piercing end, a rear end opposite the front piercing end, and a fluid passageway extending between the front piercing end and the rear end, the front piercing end including a tapered portion having an opening at a distal end of the tapered portion and a longitudinal axis, the tapered portion having a first and second surfaces defining the opening at the distal end, the first and second surfaces each being arranged in respective first and second planes that are at an angle of 20-35 degrees relative to each other.

* * * * *